US008072373B2

(12) United States Patent
Brown

(10) Patent No.: US 8,072,373 B2

(45) Date of Patent: Dec. 6, 2011

(54) METHOD FOR ACCURACY ESTIMATION OF NETWORK BASED CORRECTIONS FOR A SATELLITE-AIDED POSITIONING SYSTEM

(75) Inventor: Neil Brown, St. Gallen (CH)

(73) Assignee: Leica Geosystems AG, Heerbrugg (CH)

( * ) Notice: Subject to any disclaimer, the term of this patent is extended or adjusted under 35 U.S.C. 154(b) by 128 days.

(21) Appl. No.: 12/678,720

(22) PCT Filed: Aug. 22, 2008

(86) PCT No.: PCT/EP2008/006905

§ 371 (c)(1),
(2), (4) Date: Mar. 17, 2010

(87) PCT Pub. No.: WO2009/036860

PCT Pub. Date: Mar. 26, 2009

(65) Prior Publication Data

US 2010/0207817 A1 Aug. 19, 2010

(30) Foreign Application Priority Data

Sep. 18, 2007 (EP) .................................... 07116661

(51) Int. Cl.
*G01S 19/43* (2010.01)
*G01S 19/04* (2010.01)
*G01S 19/07* (2010.01)

(52) U.S. Cl. .......... 342/357.26; 342/357.41; 342/357.44

(58) Field of Classification Search ............. 342/357.26, 342/357.41, 357.44
See application file for complete search history.

(56) References Cited

U.S. PATENT DOCUMENTS 5,323,322 A 6/1994 Mueller et al.
5,899,957 A * 5/1999 Loomis ......................... 701/214
7,755,542 B2 * 7/2010 Chen et al. .............. 342/357.24

OTHER PUBLICATIONS

H. J. Euler, et al "Novel Concept in Multiple Gnss Network Rtk Processing" Ion Gnss 20th International Technical Meeting of the Satellite Division, Sep. 28, 2007, pp. 679-686, Fort Worth, Texas U.S.
L. Dai, et al "Comparison of interpolation techniques in network-based GPS techniques", Navigation, 50(4), 277-293 (2004).

(Continued)

*Primary Examiner* — Gregory C Issing
(74) *Attorney, Agent, or Firm* — Maschoff Gilmore & Israelsen

(57) ABSTRACT

In a method for accuracy estimation of network based corrections for a satellite-aided positioning system, with a network of reference stations code and phase measurements are recorded by the reference stations and transferred to a network processing centre. The measurements are converted to observables and single-differences between a master station and at least one auxiliary station selected for each reference station are calculated. Estimates of single-difference between each reference station and the corresponding master station are generated and slant residuals for each reference station and satellite are calculated by using the difference between calculated single-differences and estimates. Subsequently double-differences are formed by differencing satellite s and the slant residuals of a reference satellite k, leading to zenith residuals calculated by mapping the double-differences to a zenith value. Error values for each reference station are computed by using the zenith residuals and residual dispersive and non-dispersive error values for a potential rover position are estimated by combining residual dispersive and non-dispersive error values of all reference stations. The accuracy of network based corrections is represented graphically by generating a map as a grid of potential rover positions with estimated residual dispersive and non-dispersive error values.

15 Claims, 3 Drawing Sheets

OTHER PUBLICATIONS

Alfred Leick "GPS Satellite Surveying", 2nd Edition. A Wiley-Interscience Publication, John Wiley & Sons, New York, p. 259 (1995).

H. J. Euler, et al "The use of standardized network RTK messages in rover applications for surveying" Proceedings of the ION NTM 2003, Jan. 24, 2003, pp. 377-384, Anaheim, California U.S.

Lambert Wanninger "Ionospheric Disturbance Indices for RTK and Network RTK Positioning" Proceedings of the ION GNSS 2004, pp. 2849-2854, Long Beach California, U.S.

Gerhard Wuebbena, et al "GNSMART Irregularity Readings for Distance Dependent Errors" GEO++ White Paper, Jul. 22, 2004, pp. 1-6, Germany.

P. Alves, et al "Newtork RTK Quality Indication Using Linear Interpolation Residuals" Proceedings of ION GNSS, Sep. 16, 2005, pp. 2552-2563 Long Beach, California, U.S.

RTCM (2007) "RTCM Standard 10403.1 Differential GNSS (Global Navigation Satellite Systems) Services—Version 3 With Amendment 1", Radio Technical Commission for Maritime Services, Oct. 27, 2007, p. 3-29.

* cited by examiner

METHOD FOR ACCURACY ESTIMATION OF NETWORK BASED CORRECTIONS FOR A SATELLITE-AIDED POSITIONING SYSTEM

The invention relates to a method for accuracy estimation of network based corrections for a satellite-aided positioning system, a method for graphically representing the accuracy of network based corrections, a method for recording and/or communicating accuracy estimates of network based corrections for individual rovers and a computer program product.

BACKGROUND

For satellite-aided positioning systems or global navigation satellite systems (GNSS), particularly the Global Positioning System (GPS), the multiple reference station RTK approach is widely known as a differential method for combining the data from a regional reference station network to provide precise measurement correction to users in the field. This is performed by measuring the regional errors at the reference station locations and interpolating them for the location of the rover. The quality of those corrections is dependent on the reference station spacing, the location of the rover, and the characteristics of the measurement errors.

Generally, the quality of Network RTK corrections is a function of the following factors: network geometry, measurement errors, elimination of nuisance parameters (i.e. ambiguities), and the interpolation model that is used. All of these aspects are intermixed, for example, the interpolation model that is used should have the same spatial shape as the measurement errors. Alternatively, if the measurement errors are uniform then the reference stations can be located further away than if the measurement errors are not uniform.

The factors that affect Network RTK performance are generally focused around the qualities and characteristics of the measurement errors. An accurate understanding of the measurement errors leads to an optimal interpolation model and network geometry for a given level of desired rover performance.

In some of the more advanced cases of prior art the measurement error properties are extrapolated using network geometry to predict the performance for the rover in addition to the performance of the network. Many quality indicators for network RTK use the residual errors measured by the network reference stations to derive the current error conditions and characteristics. These characteristics are compared against the current interpolation model to determine the model residuals. For example, if the measured network residuals are linear and a linear interpolation model is used then there is a high likelihood that the rover will experience a high level of performance. The model residuals can then be used to predict the model inaccuracies as a function of the distance to the nearby reference stations. For example, if the model residuals are high but the rover is at a reference station then the model errors have no effect.

The ability to determine the model residuals is a function of the degrees of freedom of the interpolation model. If there are no degrees of freedom then no residuals can be determined. In this case degrees of freedom can be created by excluding one of the reference stations from the model calculation.

Network-Based RTK methods use a network of reference stations to measure the correlated error over a region and to predict their effects spatially and temporally within the network. Although the name suggests that these methods are real-time specific, they can also be used in postmission analysis. This process can reduce the effects of the correlated errors much better than the single reference station approach, thus allowing for reference stations to be spaced much further apart thereby covering a larger service area than the traditional approach, while still maintaining the same level of rover performance.

Network RTK is comprised of six main processes:

1. Processing of the reference station data to resolve the network ambiguities,
2. Selection of the reference stations that will contribute to the corrections for the rover,
3. Generation of the network corrections,
4. Interpolation of the corrections for the rover's location,
5. Formatting and transmission of the corrections and
6. Computation of the rover position.

The main task of the network computation is to resolve the ambiguities for all stations in the network to a common ambiguity level, such that the bias caused by the ambiguities is cancelled when double differences are formed. The network correction computation uses the ambiguity levelled phase observations from the network reference stations to precisely estimate the differential correlated errors for the region.

A subset of stations from the reference network, known as a cell, is selected to generate the correction for the rover based on the rover's position. One station in the cell, usually the one closest to the rover, is selected as the master station. The correction interpolation process models the network corrections to determine the effects of the correlated errors at the rover's position. Depending on the correction concept (Master Auxiliary, VRS or FKP), the interpolation may be done either by the reference station software or the rover itself. The corrections are formatted in such a way that the rover or standard RTK software can interpret them.

In U.S. Pat. No. 5,323,322 a networked differential GPS system is disclosed that provides interpolations of reference station corrections tailored for particular user locations between the reference stations. Each reference station takes real-time ionospheric measurements with codeless cross-correlating dual-frequency carrier GPS receivers and computes real-time orbit ephemeredes independently. An absolute pseudo-range correction (PRC) is defined for each satellite as a function of a particular user's location. A map of the function is constructed, with "iso-PRC" contours, wherein the network measures the PRCs at a few points, so-called reference stations and constructs an iso-PRC map for each satellite. Corrections are interpolated for each user's site on a subscription basis. Although a central processing facility comprising means for generating quality control information by using over-specified reference station information and applying a root-sum-squares algorithm is disclosed, no further specification of the quality control information is given and no map like representation is specified.

The GPS satellites currently transmit ranging signals on two frequencies L1 and L2. The ranging signal consists of unambiguous code measurements and ambiguous, but higher precision, phase measurements. The L1 and L2 code or phase measurements may be transformed into dispersive (or ionospheric) and non-dispersive (or geometric) values using the geometry free linear combination and the ionosphere free linear combination respectively, $$\Phi_{dispersive} = \frac{f_{L2}^2}{f_{L2}^2 - f_{L1}^2}(\Phi_{L1} - \Phi_{L2})$$

$$\Phi_{non-dispersive} = \frac{1}{f_{L1}^2 - f_{L2}^2}(f_{L1}^2\Phi_{L1} - f_{L2}^2\Phi_{L2})$$

where $\Phi_{L1}$ and $\Phi_{L2}$ are the raw measured code or phase measurements in meters for the L1 and L2 signals respectively, $\Phi_{dispersive}$ is the dispersive code or phase measurements in meters, $\Phi_{non\text{-}dispersive}$ is the non-dispersive code or phase measurements in meters and $f_{L1}$ and $f_{L2}$ are the frequencies in Hz of the L1 and L2 signals respectively. See e.g. RTCM (2007) "RTCM Standard 10403.1 Differential GNSS (Global Navigation Satellite Systems) Services—Version 3 With Amendment 1", Radio Technical Commission for Maritime Services, 27 Oct. 2007, page 3-29. Euler, H-J. and Zebhauser, B. E. (2003): "The Use of Standardized Network RTK Messages in Rover Applications for Surveying", Proc. Of ION NTM 2003, Jan. 22-24, 2003, Anaheim, Calif. explain how such network RTK positioning can be achieved using the Master Auxiliary Concept and how sending dispersive and non-dispersive corrections at different rates can magnify the measurement noise. However, this paper does not include how a quality indicator may be calculated that is able to predict the level of residual error after the corrections are applied or the performance of the rover. This paper summarises the basic theory that is the foundation of the Master Auxiliary Concept, namely the idea of a common ambiguity level and the representation of the network corrections as dispersive and non-dispersive correction differences, and provides an example of how these correction differences can be interpolated for a particular rover location. The theory is also useful as background to this invention which describes the quality of the corrections for a set of arbitrary rover locations and which is also derived from ambiguity levelled phase ranges.

In Wanninger, L. (2004): "*Ionospheric Disturbance Indices for RTK and Network RTK Positioning*", Proc. of ION GNSS 2004, Long Beach, Calif. an approach with an ionospheric Network RTK index I95L is disclosed where the index is computed from a 4 station sub-network with the ionospheric correction model being based on the observations of 3 surrounding reference stations and a fourth station being used as a monitor station. However, the approach provides only an index without calculation of values for a given rover location. Further, the index does not apply to the non-dispersive, i.e. troposphere and geometry component. Wübbena, G., Schmitz, M., Bagge, A. (2004) "*GNSMART Irregularity Readings for Distance Dependent Errors*", White Paper, Geo++, mention the ionospheric delay of GNSS observations as the major error source in the atmosphere, which results into a dependency of a GNSS user from the separation to a reference station. Therefore, focus is placed on the ionospheric error component with an irregularity proposed as an indicator to decide on processing strategies on a RTK rover system in the field. However, the approach is based on per satellite residuals and does not calculate values for a given rover location. The distance based irregularity parameter is discontinuous and applies only to the dispersive component.

Two different ionospheric linearity indicators to predict Network RTK performance are proposed in Chen, X., Landau, H., Vollath, U., (2003) "*New Tools for Networked RTK Integrity Monitoring*", ION GPS/GNSS 2003, Sep. 9-12, 2003, Portland, Oreg. The ionospheric residual integrity monitoring omits one reference station from interpolation and then compares the interpolation results at that station with the real measurements. It computes a weighted RMS over all satellites which can also be considered as integrity monitoring for residual interpolation and ambiguity resolution in the network. The ionospheric residual interpolation uncertainty as second indicator uses sufficient surrounding reference stations and produces standard deviation of interpolation with an interpolation method such as weighted linear interpolation method. The standard deviation represents the ionospheric linearity over the interpolation region for the field user. In this document it is also proposed to use similar indicators that can be used for the non-dispersive part. However, neither non-dispersive errors are disclosed in detail nor are equations specified. The values are generated when a position (latitude, longitude and height) is received from a rover. This requires the rover to determine the height and to transmit the information. Further, the model is discontinuous, i.e. artificial irregularities do exist between different parts of the network, and does not use the data of the whole network in the calculation of the quality estimates. The representation is based on the distance and change in height from a single reference station.

An overview of prior art is also given in Alves, P., Geisler, I., Brown, N., Wirth, J. and Euler, H.-J. (2005) "*Introduction of a Geometry-Based Network RTK Quality Indicator*", GNSS 2005, Dec. 8-10, 2005, Hong Kong. In this document also a network RTK quality indicator based on the characteristics of the measurement errors is introduced. The indicator assumes that the more linear the regional correlated errors, the better the interpolation methods will perform. The linearity of the network measurement errors is measured and weighted based on the distance to the rover. However, the approach also is discontinuous and does not use the data of the whole network in the calculations. It does not apply to the non-dispersive component and does not use height information.

SUMMARY

An object of the invention is to provide an improved method for calculating and representing, e.g. graphically, correction-related values, such as error estimates, for a GNSS.

A further object is to provide a method which permits improved calculation of solutions of base lines coordinated with one another.

Another object is to provide a continuous representation of network RTK accuracy, particularly a graphical representation.

A further object is to provide a method which allows calculating, recording and communicating correction-related values for the location of a real rover or for arbitrary points in the vicinity of reference stations.

A further object is to provide an improved method which incorporates ionospheric and non-ionospheric errors.

These objects are achieved, according to the invention, by the features of claim 1 and by the features of the sub claims or the solutions are further developed.

The present invention relates to a method for continuous representation of network RTK accuracy for a satellite-aided positioning system. The inventive approach is based on a continuous interpolation technique that is used to avoid introduction of boundary discrepancies and irregularities which occur when switching between reference stations or sets of reference stations. In order to achieve this result data from all reference stations within the network—as opposed to a subset of reference stations near the rover—are used in the calculation of the residual dispersive and non-dispersive error values at each rover location. A specific embodiment combines information from a digital elevation model so that realistic values for the non-dispersive component can be computed over a defined region and without transmission of height information by the rover. Thereby, the system does not require position data or other input from the rover.

Based on this approach the inventive method gives an easy to interpret representation of the accuracy of the network RTK corrects over the entire area of the network and provides information on where the highest errors are in the network, enabling the operator to decide where to put new reference stations. Also, the method shows the impact of station outages on the performance of the system.

Prior art has been identified and outlined above that describes how 1) phase measurements may be reduced to a common ambiguity level, 2) corrections may be represented in terms of dispersive and non-dispersive corrections, 3) the corrections may be interpolated for the position of a rover, 4) quality indicators for the interpolated corrections may be derived, and 5) the quality indicators may be represented graphically. However, none of the methods in the prior art provides a means of deriving quality indicators for the corrections that 1) represents both the dispersive and non-dispersive components for an arbitrary rover location within or near the boundaries of the network, 2) uses the full data of the network in the generation of the quality indicators, 3) does not introduce artifacts, errors or discontinuities into the representation (which occur when a method arbitrarily switches between reference stations or sets of reference stations) and 4) that is applicable to both network and single base RTK.

The calculation of error values is performed by carrying out the following steps 1. Raw code and phase measurements are recorded by multiple receivers tracking signals from GNSS satellites on two or more frequencies. The measurements are transferred, either in real time or offline, to a network processing centre. The raw measurements are corrected for the calculated range between the reference station and the satellite. In the case of phase measurements, the processing centre adjusts the measurements to a common ambiguity level, e.g. as disclosed in RTCM (2007) "RTCM Standard 10403.1 Differential GNSS (Global Navigation Satellite Systems) Services—Version 3 With Amendment 1", Radio Technical Commission for Maritime Services, 27 Oct. 2007, page 3-57. This information can be obtained via the standardized RTCM v3.1 Network RTK Messages (which are based on the Master Auxiliary Concept) or via proprietary data formats directly from the network processing software. The raw code and phase measurements may also be corrected for common errors such as antenna phase centre variations and atmospheric delays using standard models. For example, antenna phase centre variations may be corrected using publically available type mean or individual antenna calibrations. Tropospheric path delays may be corrected using e.g. the Modified Hopfield method based on a standard atmosphere, see also Goad, C. C. and Goodman, L. (1974), 'A Modified Hopfield Tropospheric Refraction Correction Model', *Proceedings of American Geophysical Union Fall Annual Meeting*, San Francisco, Calif. Thus the following corrected code or ambiguity leveled phase ranges are obtained, $$\tilde{\Phi}_{L1}=R-\Phi_{L1}+T-\lambda_{L1}N_{L1}+t_{L1}$$

$$\tilde{\Phi}_{L2}=R-\Phi_{L2}+A_{L2}+T-\lambda_{L2}N_{L2}+t_{L2}$$

where $\tilde{\Phi}_{L1}$ and $\tilde{\Phi}_{L2}$ are the corrected measured code or ambiguity leveled phase ranges in meters for the L1 and L2 signals respectively, $R=\sqrt{(X^S-X_R)^2+(Y^S-Y_R)^2+(Z^S-Z_R)^2}$ is the computed geometric range between the known position of the reference station $X_R, Y_R, Z_R$ and the computed position of the satellite $X^S, Y^S, Z^S$, $A_{L1}$ and $A_{L2}$ are the antenna phase centre variation corrections for the L1 and L2 measurements respectively, T is the tropospheric path delay from the standard atmosphere model, $N_{L1}$ and $N_{L2}$ are the integer ambiguity values that adjust the phase ranges to a common ambiguity level (for code measurements $N_{L1}=N_{L2}=0$), and $\lambda_{L1}$ and $\lambda_{L2}$ are the wavelengths of the L1 and L2 signals respectively. $t_{L1}$ and $t_{L2}$ are optional clock terms that are applied as part of RTCM (2007) "RTCM Standard 10403.1 Differential GNSS (Global Navigation Satellite Systems) Services—Version 3 With Amendment 1", Radio Technical Commission for Maritime Services, 27 Oct. 2007, page 3-57 to ensure that the magnitude of the corrected code or phase ranges is reduced for packaging into a certain number of bits for transmission. The $\tilde{\Phi}_{L1}$ and $\tilde{\Phi}_{L2}$ corrected measurements contain residual error from a variety of sources, but which are dominated by ionospheric and geometric components and hence may be more meaningfully expressed as dispersive and non-dispersive values $\tilde{\Phi}_{dispersive}$ and $\tilde{\Phi}_{non\text{-}dispersive}$.

2. For each receiver in the network and for each tracked satellite the measurements on the different GNSS frequencies (e.g. L1, L2, L5, E1, E5, E6) are converted to non-dispersive (troposphere and geometry) and dispersive (ionosphere) observables using the equations given above or refer to RTCM (2007) "RTCM Standard 10403.1 Differential GNSS (Global Navigation Satellite Systems) Services—Version 3 With Amendment 1", Radio Technical Commission for Maritime Services, 27 Oct. 2007, 142 pp, page 3-29.

3. For each reference station in the network, a set of nearby reference stations is chosen. One of the nearby reference stations is selected as a master station. Baselines are formed between the master station and the other nearby reference stations (auxiliary stations) using between-receiver single differences, see also Leick, Alfred (1995): "*GPS Satellite Surveying*", 2nd Edition. A Wiley-Interscience Publication, John Wiley & Sons, New York, page 259. Single difference values are computed for both the dispersive and non-dispersive corrected ranges.

4. Estimates of the single difference dispersive and non-dispersive error between each reference station and its designated master station are made. The estimates can be obtained by interpolating (or extrapolating) the single difference values between the master and auxiliary stations. Correction smoothing may be applied to reduce the influence of measurement noise and multipath. Suitable methods of interpolation include the linear combination model, distance-based linear interpolation method, linear interpolation method, low-order surface model and least squares collocation as disclosed in Dai et Dai, L., Han, S., Wang, J., & Rizos, C. (2004) "*Comparison of interpolation techniques in network-based GPS techniques*", Navigation, 50(4), 277-293, page 278).

5. Residuals are calculated for each reference station and satellite using the difference between the single differenced corrected ranges and interpolated corrected ranges, $$\Delta v_{dispersive}=\Delta\tilde{\Phi}_{dispersive}-\Delta\hat{\Phi}_{dispersive}$$

$$\Delta v_{non\text{-}dispersive}=\Delta\tilde{\Phi}_{non\text{-}dispersive}-\Delta\hat{\Phi}_{non\text{-}dispersive}$$

where ν is the slant residual, Δ is the single difference operator, $\tilde{\Phi}$ is a corrected code or ambiguity leveled phase range and $\hat{\Phi}$ is an interpolated (or extrapolated) code or ambiguity leveled phase range from the previous step. Since the residuals are in the direction between the satellite and receiver, they are denoted slant residuals to contrast them from later residuals which are mapped to a common zenith direction.

6. In order to eliminate the single difference ambiguity bias, double differences are formed by differencing between the slant residuals for each satellite s and the slant residuals of a reference satellite k $$\nabla\Delta v_{dispersive} = \Delta v_{dispersive}^{s} - \Delta v_{dispersive}^{k}$$

$$\nabla\Delta v_{non\text{-}dispersive} = \Delta v_{non\text{-}dispersive}^{s} - \Delta v_{non\text{-}dispersive}^{k}$$

where $\nabla\Delta$ is the double difference operator.

7. The double difference slant residuals are mapped to the zenith direction using a suitable mapping function, e.g. $z_{dispersive} = \nabla\Delta v_{dispersive} \cdot \sin(\theta)$ and $z_{non\text{-}dispersive} = \nabla\Delta v_{non\text{-}dispersive} \cdot \sin(\theta)$ where $\theta$ is the satellite elevation in radians.

8. Residual dispersive and non-dispersive error values, $I_r$ and $T_r$ respectively, are computed for each reference station r using the double difference zenith residuals $$I_r = \sqrt{\frac{\sum_{s=1}^{m} (z_{dispersive}^{s})^2}{m}}$$

$$T_r = \sqrt{\frac{\sum_{s=1}^{m} (z_{non-dispersive}^{s})^2}{m}}$$

where m is the number of double-difference zenith residuals $z_{dispersive\ and\ znon\text{-}dispersive}$. These error values are a kind of root-mean-square (RMS) or standard deviation.

9. For the dispersive error, the residual dispersive error at each of the reference stations is used to estimate the residual dispersive error at a particular rover location (latitude and longitude) which may be inside or outside the boundaries of the network. A continuous interpolation technique is used to avoid introduction of boundary discrepancies and irregularities which occur when switching between reference stations or sets of reference stations. The term residual dispersive error is used since the value includes corrections made using measurement differencing (double differencing), interpolated network corrections and antenna phase centre variation and standard atmosphere models.

The residual dispersive error value $I_{\phi,\lambda}$ at an actual or potential rover position defined by latitude and longitude $\phi,\lambda$ can be estimated by combining the values of each station using $$I_{\phi,\lambda} = \frac{\sum_{r=1}^{n} (D \cdot I_r \cdot W_{r,1})}{n}$$

where $I_r$ is the residual dispersive error value at reference station r, n is the number of reference stations in the network, $D=\alpha_1 \cdot \sqrt{(\phi-\phi_r)^2+(\lambda-\lambda_r)^2}$, $\phi_r,\lambda_r$ are the latitude and longitude of the reference station, $\alpha_1$ is an empirically derived scaling factor and $W_{r,l}$ is any suitable weighting function such as distance dependant.

10. For the non-dispersive error, the residual non-dispersive error value at each reference station is used together with a digital elevation model to estimate the residual non-dispersive error value at a particular rover location (latitude, longitude and height) which may be inside or outside the boundaries of the network. A continuous interpolation technique is used to avoid introduction of boundary discrepancies and irregularities which occur when switching between reference stations or sets of reference stations.

The residual non-dispersive error value $T_{\phi,\lambda,h}$ at an actual or potential rover position defined by latitude, longitude and height $\phi,\lambda,h$ can be estimated by combining the values of each station using $$T_{\phi,\lambda,h} = \frac{\sum_{r=1}^{n} (H \cdot T_r + D \cdot I_r) \cdot W_{r,2}}{n}$$

where $T_r$ is the residual non-dispersive error value at reference station r, n is the number of reference stations in the network, $D=\alpha_1 \cdot \sqrt{(\phi-\phi_r)^2+(\lambda-\lambda_r)^2}$, $H=\alpha_2 \cdot |h-h_r|$, $\phi_r,\lambda_r,h_r$ are the latitude, longitude and height of the reference station, $\alpha_1$ and $\alpha_2$ are empirically derived scaling factors and $W_{r,2}$ is any suitable weighting function such as distance dependant.

11. The estimated residual dispersive and non-dispersive error values are used to provide validity and usability information to the rover user and the network operator. This estimated dispersive and non-dispersive error values can be used to generate maps by estimating values for a grid which can be then used to set the value of a pixel in computer graphics or as the basis for generation of a contour map.

In a specific embodiment for estimation of the residual error for a single base RTK user—as opposed to a network RTK user—step 3 is modified and replaced with the following alternative whereas step 4 is not needed for this task 3. For each reference station in the network, select the nearest reference station a master station. Form a baseline between each reference station and its master using between-receiver single differences as disclosed in Leick, Alfred (1995): "*GPS Satellite Surveying*" 2nd Edition. A Wiley-Interscience Publication, John Wiley & Sons, New York, page 259. Single difference values are computed for both the dispersive and non-dispersive observables.

4. This step is not needed for single base RTK residual estimation.

BRIEF DESCRIPTION OF THE DRAWINGS

The method according to the invention is shown schematically below by means of drawings and described in more detail purely by way of example. Specifically.

DETAILED DESCRIPTION OF THE DRAWINGS

Figure 1:
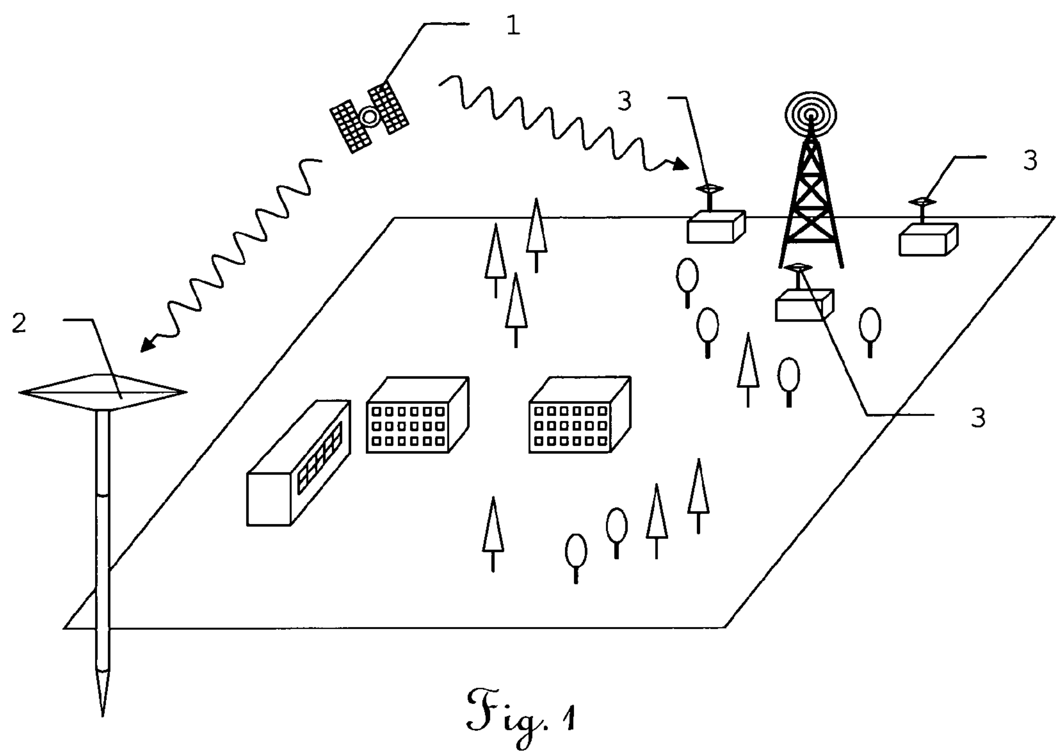
FIG. 1 shows the principle of an RTK network.

FIG. 1 shows the principle of an RTK network. The signals transmitted by a satellite 1 of a GNSS are received by receivers of a rover 2 in the field which position has to be determined with high precision and in parallel by reference stations 3 forming a network.

Figure 2:
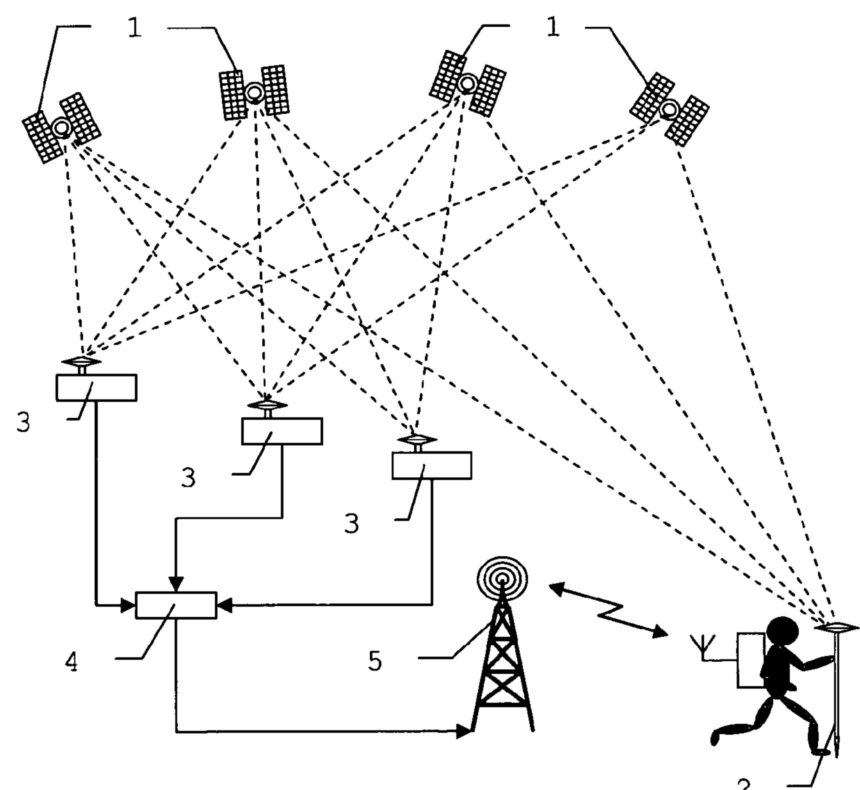
FIG. 2 shows the transmission of corrections from an RTK-network to a rover.

The transmission of corrections from an RTK-network to a rover 2 is shown in FIG. 2. The signals transmitted by the satellites 1 of a GNSS are received by the receivers of the plurality of network reference stations 3. After a first processing in the reference stations 3 the signals are communicated to a network processing centre 4 where the corrections are calculated and subsequently transmitted via a transmitter 5 to the rover 2. The inventive method allows calculating of estimated accuracy for the dispersive or ionospheric component of the network RTK corrections and for potential or actual positions of the rover 2. Those values for estimated accuracy can be recorded and/or communicated to individual rovers in the field.

Figure 3:
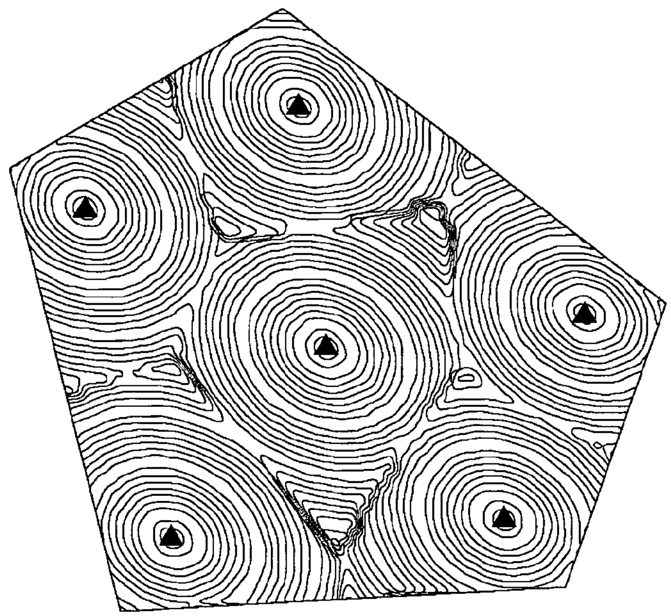
FIG. 3 shows a contour map of estimated accuracy for the dispersive (ionospheric) component of the network RTK corrections according to prior art.

FIG. 3 shows a contour map of estimated accuracy for the dispersive or ionospheric component of the network RTK corrections according to prior art. The locations of the reference stations are shown as filled triangles. The boundary problems where the radial station-dependant estimates meet are apparent.

Figure 4:
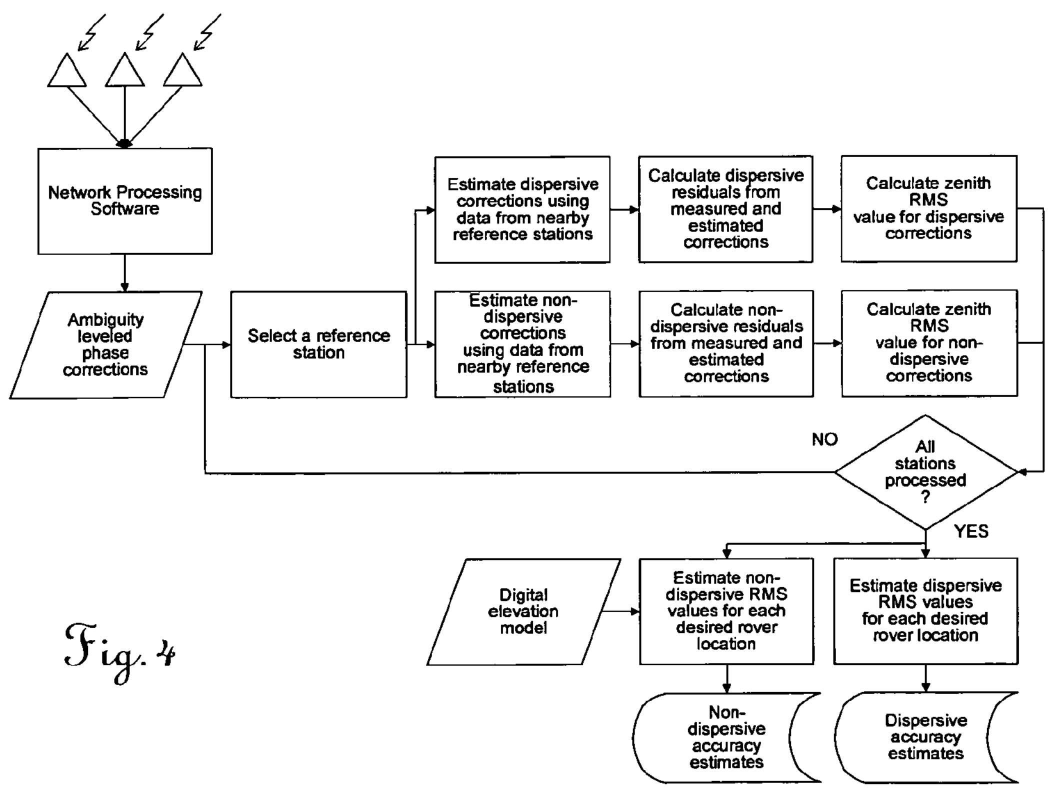
FIG. 4 shows a flow diagram illustrating the process for calculating the accuracy estimates which can then be used to generate maps.

FIG. 4 shows a flow diagram illustrating the process for calculating the accuracy estimates which can then be used to generate maps according to the inventive method.

Figure 5:
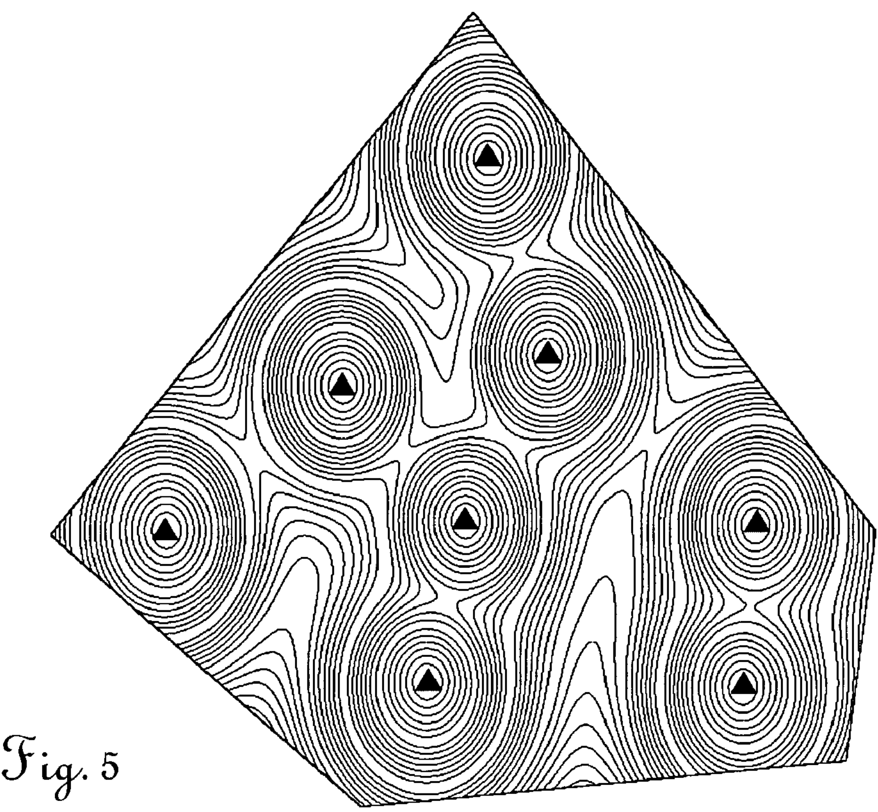
FIG. 5 shows a contour map of estimated accuracy for the dispersive (ionospheric) component of the network RTK corrections and FIG. 6 shows a contour map of estimated accuracy for the non-dispersive (tropospheric and geometric) component of the network RTK corrections.

In FIG. 5 a contour map of estimated accuracy for the dispersive or ionospheric component of the network RTK corrections calculated by the inventive method is shown. The locations of the reference stations are shown as filled triangles.

Figure 6:
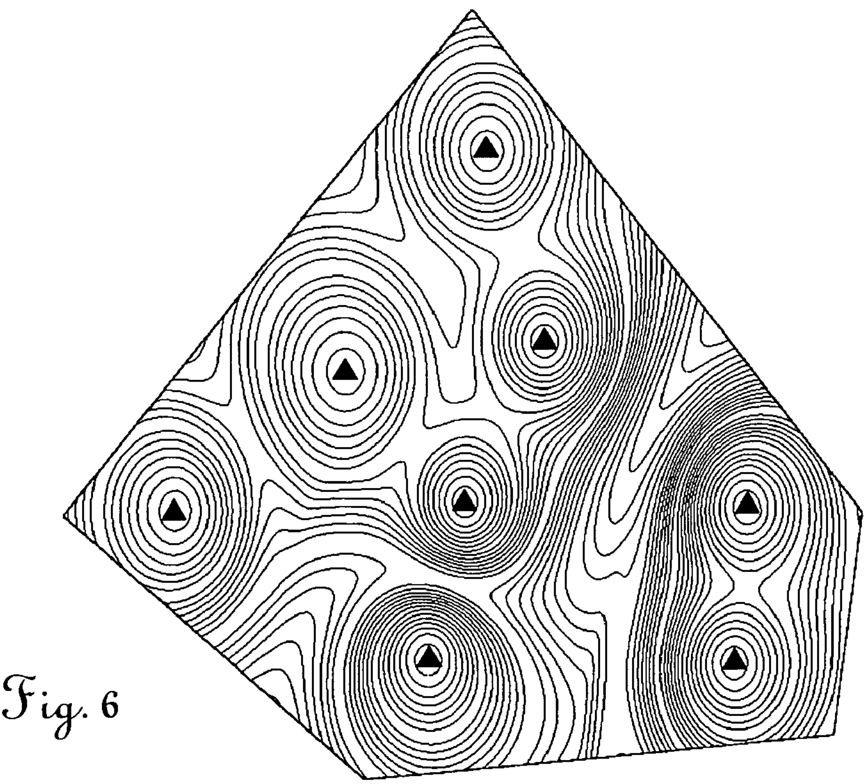

FIG. 6 shows a corresponding contour map of estimated accuracy for the non-dispersive or tropospheric and geometric component of the network RTK corrections. The locations of the reference stations are shown as filled triangles.

The embodiments shown represent only examples of possible reference station networks and GNSS and are therefore not to be understood as being definitive and limiting. Moreover, the person skilled in the art can derive further frequencies and algorithms suitable for a method according to the invention, for example for Galileo, Compass or GLONASS.

I claim:

1. A method for accuracy estimation with continuous representation of network based corrections for a satellite-aided positioning system, with a network of reference stations for receiving signals transmitted by satellites of the positioning system and transmitting corrections to a rover, wherein the method comprises:

- recording code and phase measurements by the reference stations;
- transferring the measurements to a network processing center;
- converting the measurements to dispersive and/or non-dispersive observables;
- correcting the measurements for the geometric range, ambiguity, antenna phase centre variations, tropospheric path delays using a standard atmosphere model and clock error;
- calculating single-differences between a master station and at least one auxiliary station selected for each reference station;
- generating estimates of single-difference between each reference station and the corresponding master station;
- calculating slant residuals for each reference station and satellite by using the difference between calculated single-differences and estimates;
- forming double-differences by differencing between the slant residuals for each satellite s and the slant residuals of a reference satellite k;
- calculating zenith residuals by mapping the double-differences to the zenith direction;
- computing dispersive and/or non-dispersive error values for each reference station by using the zenith residuals; and
- estimating the residual dispersive and/or non-dispersive error values for a potential or actual rover position after the network corrections have been applied by combining dispersive and/or non-dispersive error values of all reference stations.

2. The method according to claim 1, wherein the single-differences are calculated for each reference station between a master station and a set of nearby reference stations as auxiliary stations.

3. The method in claim 1, wherein the interpolating uses a linear combination model, distance-based linear interpolation method, linear interpolation method, low-order surface model or least squares collocation.

4. The method according to claim 1, wherein the non-dispersive error values for a potential or actual rover position are estimated by using a digital elevation model which provides the height information for the potential rover position.

5. The method according to claim 1, wherein the slant residuals are calculated according to $$\Delta v_{dispersive} = \Delta\tilde{\Phi}_{dispersive} - \Delta\hat{\Phi}_{dispersive}$$

$$\Delta v_{non\text{-}dispersive} = \Delta\tilde{\Phi}_{non\text{-}dispersive} - \Delta\hat{\Phi}_{non\text{-}dispersive}$$

where v is the slant residual, Δ is a single difference operator, Φ is a corrected code or ambiguity leveled phase range and $\hat{1}\hat{0}\hat{1}$ is an estimated code or ambiguity leveled phase range.

6. The method according to claim 5 wherein the double-differenced slant residuals are formed according to $$\nabla\Delta v_{dispersive} = \Delta v_{dispersive}^{s} - \Delta v_{dispersive}^{k}$$

$$\nabla\Delta v_{non\text{-}dispersive} = \Delta v_{non\text{-}dispersive}^{s} - \Delta v_{non\text{-}dispersive}^{k}$$

where ∇Δ is the double difference operator.

7. The method according to claim 6, wherein the zenith residuals $z_{dispersive}$ and/or $z_{non\text{-}dispersive}$ are calculated with the mapping function $z_{dispersive} = \nabla\Delta v_{dispersive} \cdot \sin(\theta)$ and $z_{non\text{-}dispersive} = \nabla\Delta v_{non\text{-}dispersive} \cdot \sin(\theta)$ where θ is the satellite elevation in radians.

8. The method according to claim 7, wherein the residual dispersive error values $I_r$ and/or non-dispersive error values $T_r$ are computed for each reference station r using the double difference zenith residuals $$I_r = \sqrt{\frac{\sum_{s=1}^{m} (z_{dispersive}^{s})^2}{m}}$$

-continued $$T_r = \sqrt{\frac{\sum_{s=1}^{m} (z^s_{non-dispersive})^2}{m}}$$

where m is the number of zenith residuals $Z_{dispersive}$ and $Z_{non\text{-}dispersive}$.

9. The method according to claim 8, wherein the residual dispersive error value $I_{\phi,\lambda}$ for a potential or actual rover position at a defined latitude and longitude $\phi,\lambda$ is estimated as $$I_{\phi,\lambda} = \frac{\sum_{r=1}^{n} (D \cdot I_r \cdot W_{r,1})}{n}$$

where $I_r$ is the residual dispersive error value at reference station r, n is the number of reference stations (3) in the network, $D=\alpha_1 \cdot \sqrt{(\phi-\phi_r)^2+(\lambda-\lambda_r)^2}$, $\phi_r,\lambda_r$ are the latitude and longitude of the reference station, $\alpha_1$ is an empirically derived scaling factor and $W_{r,1}$ is a weighting function, particularly distance dependant.

10. The method according to claim 8, wherein the residual non-dispersive error value $T_{\phi,\lambda,h}$ for a potential or actual rover position at a defined latitude, longitude and height $\phi,\lambda,h$ is estimated as $$T_{\phi,\lambda,h} = \frac{\sum_{r=1}^{n} (H \cdot T_r + D \cdot I_r) \cdot W_{r,2}}{n}$$

where $T_r$ is the residual non-dispersive error value at reference station r, n is the number of reference stations in the network, $D=\alpha_1 \cdot \sqrt{(\phi-\phi_r)^2+(\lambda-\lambda_r)^2}$, $H=\alpha_2 \cdot |h-h_r|$, $\phi_r,\lambda_r,h_r$ are the latitude, longitude and height of the reference station (3), $\alpha_1$ and $\alpha_2$ are empirically derived scaling factors and $W_{r,2}$ is a weighting function, particularly distance dependant.

11. A method for graphically representing the accuracy of network based corrections with generating a map by estimating error values for a grid of potential rover positions with the method according to the method of claim 1.

12. A method for recording and/or communicating accuracy estimates of network based corrections for individual rovers by estimating error values for the rover's positions with the method according to the method of claim 1.

13. A computer program product as a recording on a tangible data medium with code sequences for carrying out the method according to claim 1.

14. The method according to claim 1, wherein the network includes an RTK network.

15. The method according to claim 1, wherein generating estimates of single-difference between each reference station and the corresponding master station is accomplished by interpolating single difference values between the master station and the corresponding auxiliary stations.

* * * * *